(12) United States Patent
Wernet et al.

(10) Patent No.: US 8,217,661 B2
(45) Date of Patent: Jul. 10, 2012

(54) APPARATUS FOR ASCERTAINING AND/OR MONITORING A PROCESS VARIABLE

(75) Inventors: Armin Wernet, Rheinfelden (DE); Roland Dieterle, Lörrach (DE); Kaj Uppenkamp, Wehr (DE)

(73) Assignee: Endress + Hauser GmbH + Co. KG, Maulberg (DE)

( * ) Notice: Subject to any disclaimer, the term of this patent is extended or adjusted under 35 U.S.C. 154(b) by 526 days.

(21) Appl. No.: 12/310,849

(22) PCT Filed: Jul. 16, 2007

(86) PCT No.: PCT/EP2007/057290
§ 371 (c)(1),
(2), (4) Date: Jun. 25, 2009

(87) PCT Pub. No.: WO2008/031659
PCT Pub. Date: Mar. 20, 2008

(65) Prior Publication Data
US 2009/0284269 A1    Nov. 19, 2009

(30) Foreign Application Priority Data
Sep. 13, 2006  (DE) .......................... 10 2006 043 809

(51) Int. Cl.
*G01R 31/02* (2006.01)
(52) U.S. Cl. ...................................... 324/537

(58) Field of Classification Search .................. None
See application file for complete search history.

(56) References Cited

U.S. PATENT DOCUMENTS

| 6,332,366 B1 | 12/2001 | Wray |
| 2005/0035769 A1* | 2/2005 | Otto et al. .................. 324/644 |

FOREIGN PATENT DOCUMENTS

| DE | 101 61 069 A1 | 6/2003 |
| EP | 1 037 067 A1 | 9/2000 |
| WO | WO 97/04331 | 2/1997 |
| WO | WO 03/019120 A1 | 3/2003 |
| WO | WO 2004/102133 A2 | 11/2004 |

* cited by examiner

*Primary Examiner* — Paresh Patel
(74) *Attorney, Agent, or Firm* — Bacon & Thomas, PLLC

(57) ABSTRACT

An apparatus for ascertaining and/or monitoring a process variable. The apparatus includes a sensor element, and at least one electronics unit, which, for measuring the process variable, supplies the sensor element with an electrical exciter signal, receives an electrical measurement signal from the sensor element and evaluates the measurement signal with respect to the process variable. An analog-digital converter is provided in the electronics unit. For measuring the process variable, the electronics unit supplies the sensor element with a first exciter signal and a second exciter signal, timewise one after the other, in such a manner, that the first exciter signal and the second exciter signal have a settable phase ($\varphi$) relative to one another.

8 Claims, 2 Drawing Sheets

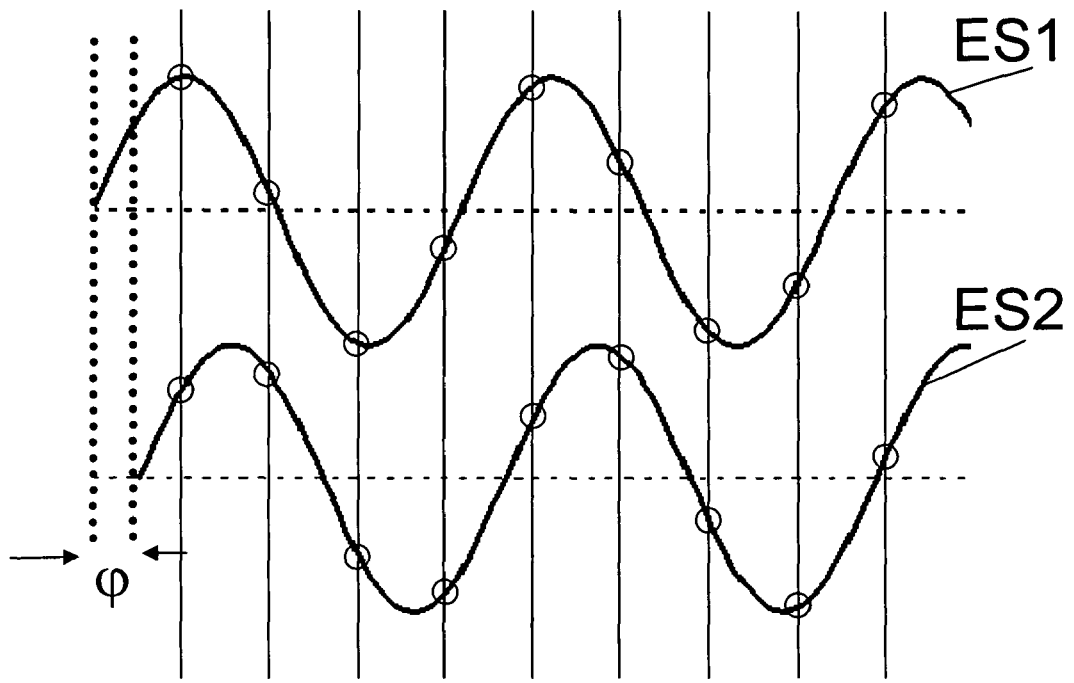

APPARATUS FOR ASCERTAINING AND/OR MONITORING A PROCESS VARIABLE

TECHNICAL FIELD

The invention relates to an apparatus for ascertaining and/or monitoring at least one process variable. The apparatus includes at least one sensor element, and at least one electronics unit, which, for measuring the process variable, supplies the sensor element with at least one electrical exciter signal, receives from the sensor element at least one electrical measurement signal and evaluates the measurement signal with respect to the process variable, wherein the measurement signal is at least dependent on the exciter signal and/or the process variable and/or a change of the process variable, and wherein at least one analog-digital converter is provided in the electronics unit. The process variable is, for example, fill-level, density, viscosity, pH-value, pressure, flow, e.g. flow rate, or temperature of a medium, which is, in turn, for example, a liquid, a bulk good, a gas or a fluid.

BACKGROUND DISCUSSION

In a large number of measuring devices, either the exciter signals or the measurement signals, from which information concerning the process variables are derived, are digitized, in order, therewith, to simplify and improve the signal processing. Such is described, for example, in published international application, WO 2004/102133 for the case of a capacitive, fill-level, measuring device.

The signals to be processes are, most often, electrical signals, which are either alternating voltages or are transmitted in alternating voltages. These alternating voltages are then converted into digital signals by an analog-digital converter. In such case, the analog signals are sampled at sampling points, which are usually spaced equally in time. The resolution and, therewith, the accuracy, possessed by the digital signal, depends, in such case, on the number of sampling points. Due to available memory, available energy or achievable sampling rate of the analog-digital converter, on occasion, the resolution cannot be increased as much as desired. In order, in spite of such constraints, to increase the resolution, there is the so-called equivalence-time method. This can be applied, especially, to periodic signals. In such method, a signal is either multiply produced or multiply sampled with a fixed sampling rate. At each sampling, the time points of the sampling are offset, or, since the sampling rate is fixed, the point in time for the first sampling point is offset. At each sampling, thus, the same number of points are sampled. Since these, are, however, between the individual samplings, offset relative to one another, correspondingly many data sets result, which, together, describe the entire signal, wherein the digitized data must be appropriately processed. See, in this connection, German Patent DE 4434688 A1, published international application, WO 03/019120 A1, or Japanese patent, JP 05041094A. This method is usually accomplished in such a manner, that the sampling is appropriately offset in the analog-digital converter.

SUMMARY OF THE INVENTION

An object is to provide a measuring device, in which the resolution of the sampling is increased in an alternative manner compared with the state of the art.

The solution of the invention for achieving the object includes the feature that the electronics unit is embodied in such a manner, that the electronics unit, for a measuring of the process variable, supplies the sensor element at least with a first exciter signal and a second exciter signal timewise one after the other in such a manner, that the first exciter signal and the second exciter signal have an settable phase relative to one another. The invention resides, thus, in the fact that, in contrast with the state of the art, not the sampling is offset, but, instead, the signal to be processed is not offset in time. Through this time shifting, there results a phase between the exciter signals, or, therewith, also between the associated measurement signals. The invention enables, thus, by the phase of the exciter signals, that, on the one hand, the exciter signals themselves can experience a higher resolution, since the sampling of these signals yields an increased resolution of the exciter signal itself. On the other hand, the measurement signals associated also with a measurement, experience a higher resolution, since, thus, also the multiply produced measurement signal with the time offset, which expresses itself in the phase, is multiply digitized. The exciter signals are, in such a case, then produced often and at such a time spacing, that such is small relative to the rate of change of the process variable, i.e. the associated measurement signals belong to the same value of the process variable. Furthermore, there is, simultaneously, a measuring from the repeated supplying of the sensor element with the same exciter signal and the repeated receiving of the measurement signal. Essential, in such case, is that the sensor element is supplied repeatedly with the same exciter signal, so that also the measurement signal results correspondingly in multiple fashion.

An embodiment provides that the analog-digital converter is embodied in such a manner, that the analog-digital converter samples the exciter signal and/or the measurement signal at predetermined sampling points. &The analog-digital converter is, thus, embodied in such a manner, that it samples the signals at fixed sampling time points. In most cases, these points have equidistant separations. According to the invention, it is, in such case, not necessary to change the position of these points.

An embodiment includes, an electronics unit embodied in such a manner, that the electronics unit digitizes the first exciter signal at the predetermined sampling points, the electronics unit digitizes the second exciter signal at the predetermined sampling points, and the electronics unit processes the digitized data of the first exciter signal and the digitized data of the second exciter signal in such a manner, that an assembled digitizing of the exciter signal results for the measuring, wherein the digitized data of the first exciter signal and the digitized data of the second exciter signal are, in each case, offset relative to one another corresponding to the settable phase. Through the quasi multiple sampling of the same signal, individual sample values of the signal result per se, which must be brought into the appropriate sequence by a suitable sorting or appropriately processed in the following processing with respect to the process variable. If, for instance, there is a double sampling of an exciter signal by the double supplying of the sensor element with this exciter signal, then the digitized signal of the exciter signal is assembled alternately of the digitized data of the first supplying and the digitized data of the second supplying.

An embodiment provides, an electronics unit embodied in such a manner, that the electronics unit digitizes, at the predetermined sampling points, a first measurement signal belonging to the first exciter signal, the electronics unit, at the predetermined sampling points, digitizes a second measurement signal belonging to the second exciter signal, and the electronics unit processes the digitized data of the first measurement signal and the digitized data of the second measurement signal in such a manner, that an assembled digitizing of the measurement signal results for the measuring. In this embodiment, the measurement signal is sampled twice, in that the exciter signal is supplied twice to the sensor element and, each time, the measurement signal is obtained. This embodiment is applied either alternatively to the preceding embodiment or in connection with it, i.e. either only the exciter signals or only the measurement signal or the exciter signals and measurement signal are digitized. The measurement signals are, in such case, likewise offset relative to one another corresponding to the phase between the exciter signals.

An embodiment includes, that the exciter signal and/or the measurement signal are/is periodic.

An embodiment provides that the first exciter signal and the second exciter signal have essentially the same frequency and the same signal shape. Preferably, the same exciter signal is supplied twice, as first and second exciter signal, to the sensor element.

An embodiment includes, that the settable phase is other than an integer multiple of $2\pi$. If, in each case, especially, periodic signals are involved, then an offset must be produced by the phase between the exciter signals or the measurement signals, which leads to the fact that the phase has to be different from $2\pi$, in order to produce an effect in the digitizing. The phase depends, in such case, on the number of sampling points and the number of the supplyings of the sensor element with the same exciter signal.

An embodiment provides that the process variable is the fill-level of a medium in a container.

An embodiment includes, that the exciter signal is an electrical, alternating voltage. In an additional embodiment, the process variable, fill-level, is ascertained, especially, capacitively. As concerns measurement principle, the fill-level can, however, also be ascertained by means of the travel-time method.

BRIEF DESCRIPTION OF THE DRAWINGS

The invention will now be explained in greater detail on the basis of the appended drawing, the figures of which show as follows:

FIG. 2 illustration of the sampling of two signals.

DETAILED DISCUSSION

Figure 1:
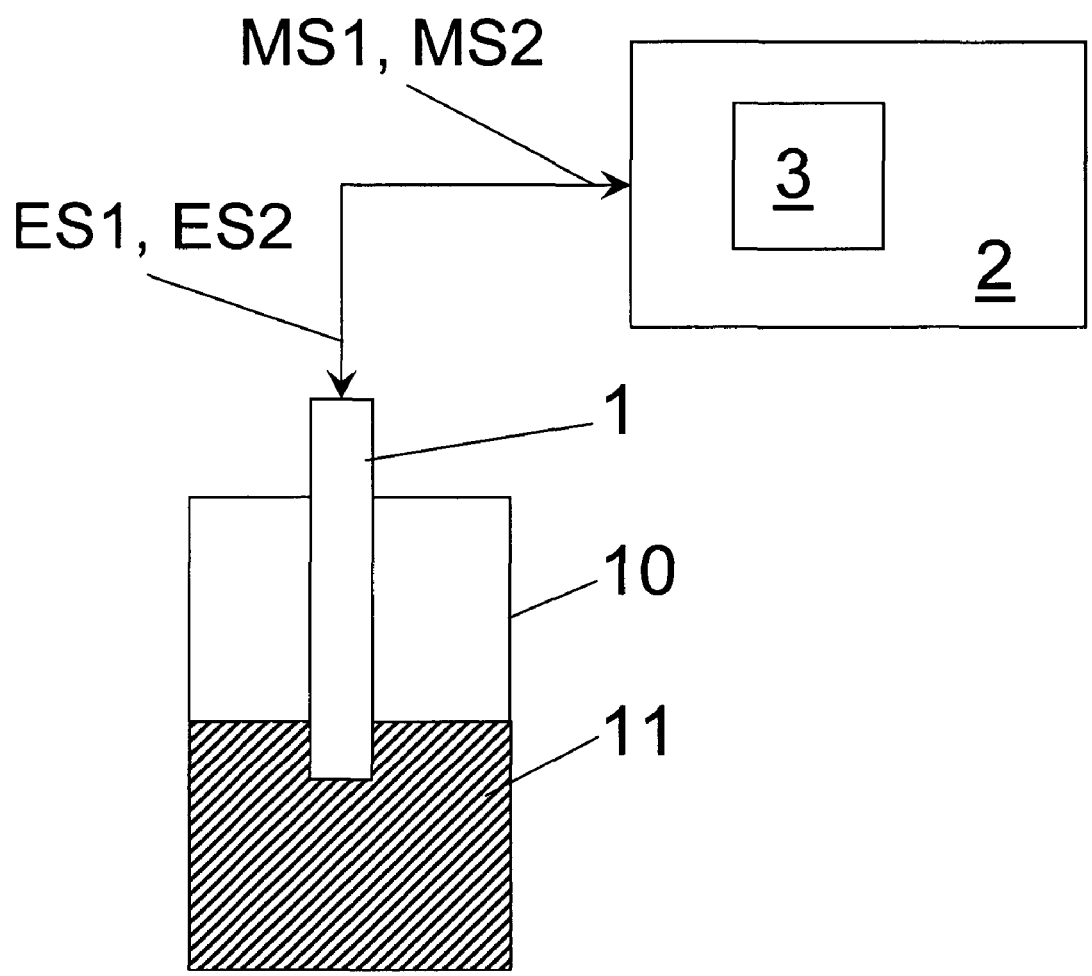
FIG. 1 schematic structure of a capacitive, fill-level measuring device.

FIG. 1 shows, by way of example, a capacitive measuring device. The sensor element 1 and the wall of the container 10 form, with the medium 11 as dielectric, a capacitor, whose capacitance depends on, among other things, the fill-level of the medium 11. Thus, it is possible to deduce, from capacitance, the fill-level. For this, sensor element 1, which can be a rod or a cable, is supplied with an electrical, alternating voltage. From the current or from the voltage resulting therefrom, for example, as measured across a resistor, the capacitance value is then ascertained. Provided for the supplying or for the evaluation is, here, an electronics unit 2. Electronics unit 2 includes for the evaluation an analog-digital converter 3. In order to increase resolution according to the invention, the sensor element 1 is supplied, here, twice with the exciter signal: ES1 and ES2. Between these signals or between the point in time of the supplying, there lies, in each case, a time delay, such that a phase $\phi$ results between the signals ES1 and ES2. Phase $\phi$ differs from an integer multiple of $2\pi$. Through the offset, also the measurement signals MS1 and MS2, in each case, associated with the exciter signals have a certain phase relative to one another. For practical purposes, thus, each measuring is composed, here, of two sub-measurements (an increase of this number is possible), which, in each case, is based on the same exciter signal and the same measurement signal. I.e., the exciter signal is not altered, it is only repeatedly supplied unchanged, but with a suitable delay, to the sensor element 1. If this is done appropriately rapidly relative to the rate of change of the process variable, then the measurement signals differ only as regards phase. (As correction and a measure of safety, on occasion, it is provided in the processing, that outliers and large deviations are recognized and appropriately handled.) In fact, thus, in each case, a measuring is repeatedly executed. If the signals are then digitized, with also the analog-digital converter 3 experiencing no change between the sub-measurements, then the phase effects, that the signals are sampled at different points. The digitized data are, in turn, then suitably re-arranged, i.e. arranged one after the other. In the state of the art, the actual signal is held fixed and the sampling signal is offset for the digitizing, while, in the invention, the sampling signal remains fixed and the actual signal is offset. The number of supplyings of the sensor element 1 with the exciter signal depends, in such case, on how strongly the resolution is to be increased. Two exciter signals lead to a doubling, three to a tripling etc. The phase depends, in such case, also on how many exciter signals are involved and on how many sampling points are provided. In the case of a doubling of the resolution, for example, the phase is half of the distance between two sampling points.

FIG. 2 shows two exciter signals ES1 and ES2. The vertical, solid lines show the sampling points, which are also indicated by the circles on the signals. The two exciter signal ES1 and ES2 are so transmitted, that there is a phase $\phi$ between them. As well to be recognized, this leads to the fact that the sampling points are, in each case, at different points of the signals. If the sampling data are then suitably rearranged, a resolution doubling results.

The method of the invention for increasing resolution in the sampling of electrical signals provides, thus, as follows: An exciter signal is produced, which is supplied to the sensor element 1 as first exciter signal ES1. The first measurement signal MS1 associated with the first exciter signal ES1 is received. In the embodiment corresponding to FIG. 2, the first exciter signal ES1 and the first measurement signal MS1 are digitized. Thereafter, the same exciter signal is supplied as second exciter signal ES2 again to the sensor element 1 and the associated second measurement signal MS2 is received. Then, again the two signals ES2 and MS2 are digitized. In conjunction therewith, also appropriate memory units are to be provided or embodied. In such case, there is, however, between the supplying of the sensor element 1 with the two exciter signals ES1 and ES2, such a time delay, that the two signals have a phase $\phi$ relative to one another, which is different from an integer multiple of $2\pi$. Through this phase, the second exciter signal ES2 is sampled at other places than the first exciter signal ES1, so that the exciter signal as a whole is sampled at twice as many places, as the analog-digital converter 3 actually permits. The same is true also for the sampling of the measurement signal, which experiences a sampling in the form of the first MS1 and of the second measurement signal MS2. Then, the individual sampling data are suitably processed. In the case of a capacitive measuring, the exciter signal is, for example, a sinusoidal, electrical, alternating voltage, while the measurement signal is an electrical current signal converted to an electrical, alternating voltage.

The invention claimed is:

1. An apparatus for ascertaining and/or monitoring at least one process variable, comprising:
   at least one sensor element; and
   at least one electronics unit, which, for measuring the process variable, supplies said at least one sensor element with at least one electrical exciter signal, receives from said at least one sensor element at least one electrical measurement signal, and evaluates the measurement signal with respect to the process variable, wherein:
   the measurement signal is at least dependent on the exciter signal and/or on the process variable and/or on a change of the process variable;
   at least one analog-digital converter is provided in said at least one electronics unit;
   said at least one electronics unit is embodied in such a manner, that, for measuring the process variable, said at least one electronics unit supplies said at least one sensor element at least with a first exciter signal and a second exciter signal, timewise one after the other, in such a manner, that the first exciter signal and the second exciter signal have a settable phase relative to one another and
   the process variable is the fill-level of a medium in a container.

2. The apparatus as claimed in claim 1, wherein:
   said at least one analog-digital converter is embodied in such a manner, that said at least one analog-digital converter samples the exciter signal and/or the measurement signal at predetermined sampling points.

3. The apparatus as claimed in claim 2, wherein:
   said at least one electronics unit is embodied in such a manner, that said at least one electronics unit digitizes the first exciter signal at the predetermined sampling points, digitizes the second exciter signal at the predetermined sampling points, and processes the digitized data of the first exciter signal and the digitized data of the second exciter signal in such a manner, that an assembled, digitized, exciter signal results for the measuring; and
   the digitized data of the first exciter signal and the digitized data of the second exciter signal are offset relative to one another corresponding to said settable phase.

4. The apparatus as claimed in claim 2, wherein:
   said at least one electronics unit is embodied in such a manner, that said at least one electronics unit digitizes, at the predetermined sampling points, a first measurement signal associated with the first exciter signal, digitizes, at the predetermined sampling points, a second measurement signal associated with the second exciter signal; and processes the digitized data of the first measurement signal and the digitized data of the second measurement signal in such a manner, that an assembled, digitized measurement signal results for the measuring.

5. The apparatus as claimed in claim 1, wherein:
   said exciter signal and/or said measurement signal are/is periodic.

6. The apparatus as claimed in claim 1, wherein:
   said first exciter signal and said second exciter signal have essentially the same frequency and the same signal shape.

7. The apparatus as claimed in claim 1, wherein:
   said settable phase differs from an integer multiple of $2\pi$.

8. The apparatus as claimed in claim 1, wherein:
   said exciter signal is an electrical, alternating voltage.

* * * * *